United States Patent
Cao et al.

(10) Patent No.: US 10,055,872 B2
(45) Date of Patent: Aug. 21, 2018

(54) SYSTEM AND METHOD OF FAST ADAPTIVE BLENDING FOR HIGH DYNAMIC RANGE IMAGING

(71) Applicant: SZ DJI TECHNOLOGY CO., LTD., Shenzhen (CN)

(72) Inventors: Zisheng Cao, Shenzhen (CN); Mingyu Wang, Shenzhen (CN); Lifu Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/431,832

(22) Filed: Feb. 14, 2017

(65) Prior Publication Data

US 2017/0154456 A1   Jun. 1, 2017

Related U.S. Application Data

(63) Continuation of application No. PCT/CN2014/091940, filed on Nov. 21, 2014.

(51) Int. Cl.
  *G06T 11/60* (2006.01)
  *G06T 5/00* (2006.01)
  (Continued)

(52) U.S. Cl.
  CPC .............. *G06T 11/60* (2013.01); *G06T 5/007* (2013.01); *G06T 7/90* (2017.01); *H04N 5/2352* (2013.01); *H04N 9/04* (2013.01)

(58) Field of Classification Search
  CPC ................................................... H04N 5/2352
  See application file for complete search history.

(56) References Cited

U.S. PATENT DOCUMENTS 5,921,931 A * 7/1999 O'Donnell ............... A61B 8/06
                                                      382/162
7,433,514 B2 * 10/2008 Sloan ....................... G06T 5/009
                                                      382/162
(Continued)

FOREIGN PATENT DOCUMENTS

CN   102420944 A   4/2012
CN   102693538 A   9/2012
(Continued)

OTHER PUBLICATIONS

European Patent Office (EPO) European Search Report for 14906594.8 dated Feb. 8, 2017 8 Pages.
(Continued)

*Primary Examiner* — Cynthia Segura
(74) *Attorney, Agent, or Firm* — Anova Law Group, PLLC

(57) ABSTRACT

A system for high dynamic range (HDR) imaging and methods for making and using same is disclosed. An HDR module in a camera initializes a set of lookup tables (LUTs) in YUV color space based on exposure configurations of a set of images taken as HDR imaging. The HDR module calculates weights of luminance Y components of the set of images in YUV color space. Based on the calculated weights, the HDR module blends the Y component of the set of images to generate blended Y components. The HDR module combines the blended Y components with corresponding UV components to generate a single image in YUV space. Thereby, the HDR module advantageously combines a set of images into a blended HDR image with only blending the Y component of the set of images.

14 Claims, 13 Drawing Sheets

(51) Int. Cl.
*G06T 7/90* (2017.01)
*H04N 5/235* (2006.01)
*H04N 9/04* (2006.01)

(56) References Cited

U.S. PATENT DOCUMENTS

| | | | | |
|---|---|---|---|---|
| 7,983,502 | B2* | 7/2011 | Cohen | G06T 5/007 |
| | | | | 382/100 |
| 8,737,736 | B2* | 5/2014 | Liu | G06T 5/50 |
| | | | | 382/169 |
| 9,598,011 | B2* | 3/2017 | Schachter | H04N 5/33 |
| 9,613,408 | B2* | 4/2017 | Micovic | G06T 5/009 |
| 9,858,644 | B2* | 1/2018 | Cao | G06T 3/4015 |
| 2007/0014470 | A1* | 1/2007 | Sloan | G06T 5/009 |
| | | | | 382/162 |
| 2008/0273119 | A1* | 11/2008 | Yang | G06T 5/002 |
| | | | | 348/575 |
| 2010/0157078 | A1* | 6/2010 | Atanassov | G06T 5/007 |
| | | | | 348/222.1 |
| 2010/0183071 | A1 | 7/2010 | Segall | |
| 2010/0271512 | A1 | 10/2010 | Garten | |
| 2011/0069906 | A1 | 3/2011 | Park et al. | |
| 2012/0002082 | A1 | 1/2012 | Johnson | |
| 2013/0335596 | A1 | 12/2013 | Demandolx | |
| 2014/0152686 | A1 | 6/2014 | Narasimha et al. | |
| 2014/0185931 | A1* | 7/2014 | Aoki | H04N 1/62 |
| | | | | 382/167 |
| 2016/0037044 | A1* | 2/2016 | Motta | H04N 9/045 |
| | | | | 348/221.1 |
| 2016/0080714 | A1* | 3/2016 | Tsukagoshi | H04N 19/70 |
| | | | | 348/453 |
| 2016/0093029 | A1* | 3/2016 | Micovic | H04N 5/2355 |
| | | | | 348/229.1 |
| 2018/0012339 | A1* | 1/2018 | Puetter | G06T 5/002 |

FOREIGN PATENT DOCUMENTS

| | | |
|---|---|---|
| JP | 2004229259 A | 8/2004 |
| JP | 2007282020 A | 10/2007 |
| JP | 2012090309 A | 5/2012 |
| JP | 2012235390 A | 11/2012 |
| JP | 2013128212 A | 6/2013 |
| JP | 2013533706 A | 8/2013 |
| WO | 2014133340 A1 | 9/2014 |

OTHER PUBLICATIONS

The World Intellectual Property Organization (WIPO) International Search Report and Written Opinion for PCT/CN2014/091940 dated Aug. 27, 2015 6 pages.

Reinhard et al., Photographic Tone Reproduction for Digital Images, ACM Transactions on Graphics, Jul. 2002, pp. 267-276, vol. 21, No. 3, ACM, New York.

Debevec and Malik, Recovering High Dynamic Range Radiance Maps from Photographs, Proc. of the 24th Annual Conference on Computer Graphic and Interactive Techniques, Aug. 3, 1997, pp. 369-378, ACM, New York.

* cited by examiner

Fig. 15A
Fig. 15B
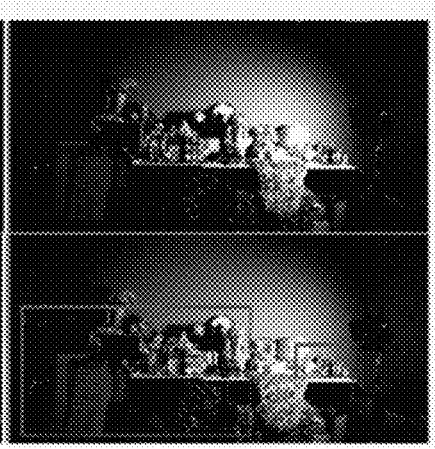
Fig. 15C
Fig. 15D
Fig. 16A
Fig. 16B
Fig. 16C
Fig. 16D

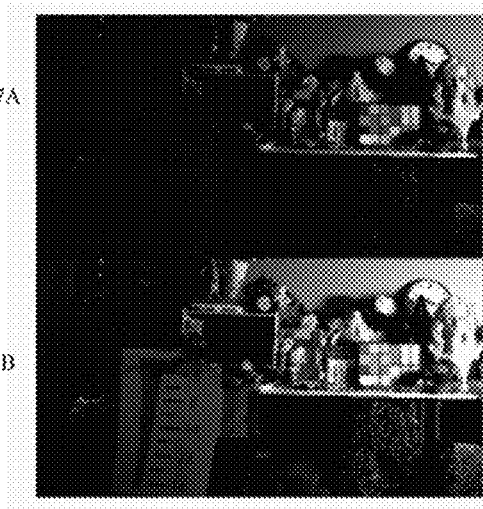
Fig. 17A
Fig. 17B
Fig. 17C
Fig. 17D

SYSTEM AND METHOD OF FAST ADAPTIVE BLENDING FOR HIGH DYNAMIC RANGE IMAGING

CROSS-REFERENCE TO RELATED APPLICATION

This is a continuation application of International Application No. PCT/CN2014/091940, filed on Nov. 21, 2014, the entire contents of which are incorporated herein by reference.

FIELD

The disclosed embodiments relate generally to high dynamic range (HDR) imaging, and more particularly, but not exclusively, to a system and method for combining a set of images into a blended HDR image in a time and cost efficient manner.

BACKGROUND

High dynamic range (HDR) is a set of techniques that are used in imaging and photographing and that can be employed to record greater luminance levels than normal photographic techniques. Traditional cameras with no HDR function take photographs with limited dynamic ranges, resulting in losses of scene details. For example, underexposure usually occurs in shadows and overexposure usually occurs in highlights when taking a non-HDR picture. This is because of the limited dynamic range capability of sensors. Usually sensors, including common charge-coupled device (CCD) sensors and complementary metal oxide semiconductor (CMOS) sensors, can acquire a dynamic range of about 1:1000, or 60 dB, of intensities of brightness. That means the maximum change is about 1000 times of the darkest signal. However, many applications require working in wider dynamic range scenes, such as 1:10000, or 80 dB. HDR imaging techniques compensate the losses of details by capturing multiple photographs at different exposure levels and combining them to produce a single image with a broader tonal range. To facilitate displays of HDR images on devices with lower dynamic range, tone mapping methods are applied to produce images with preserved localized contrasts.

To get multiple photographs for HDR imaging, modern cameras offer an automatic exposure bracketing (AEB) feature with a far greater dynamic rage. Based on this feature, it is easy to achieve a set of photographs with incremental exposure levels from underexposure to overexposure.

To display the multiple photographs taken for HDR imaging, a conventional process is accomplished by using application software running on PC. Nowadays, image signal processor (ISP) inside modern cameras has become much more powerful than before, which motivates vendors to develop faster HDR imaging methods to enable a built-in HDR feature. This trend significantly enhances convenience and efficiency of the photography. Besides, HDR video recording becomes possible if the HDR imaging can be calculated and displayed in real time.

A typical HDR process usually contains three steps: (1) estimation of camera response function; (2) combination of multiple exposures of a set of images for HDR imaging and (3) tone mapping for the combined HDR image. The imaging process of the camera is modelled as a non-linear mapping g(X) from scene radiance $E_i$ and exposure configuration $k_j$ to pixel brightness $Z_{i,j}$, denoted by Equation (1).

$$g(Z_{i,j}) = \ln E_i + \ln k_j \qquad \text{Equation (1)}$$

wherein $k_j$ is associated with aperture A (F-number), exposure time t and ISO speed S. Equation (1) is over determined because there are more equations than unknowns and can be solved by the least squares method. Usually g(X) is implemented with a look up table (LUT) from the gray scale to the radiance map.

After solving Equation (1), the combination of multiple exposures can be represented by Equation (2).

$$\ln E_i = \frac{\sum_{j=1}^{P} w(Z_{i,j})(g(Z_{i,j}) - \ln k_j)}{\sum_{j=1}^{P} w(Z_{i,j})} \qquad \text{Equation (2)}$$

where w(X) is a weighting function of the brightness, denoting the weight of $Z_{i,j}$ when recovering a scene radiance. The resulting curves for the typical weighting functions are illustrated in FIG. 12.

There are many tone mappers in the literatures for Equation (2). For a normal display, a simple tone mapping operator is denoted in Equation (3).

$$L_d' = \frac{L_d}{1 + L_d} \qquad \text{Equation (3)}$$

where $$L_d = \frac{aE}{\frac{1}{N}\sum_{j=1}^{N} \ln E_j}$$

is a scaled luminance and $\alpha = 0.18$.

As can be seen from Equations (1)-(3), the conventional HDR imaging methods usually require large amounts of computational resources. For instance, the conventional methods lead to the uses of a least squares method, which is usually solved by the singular value decomposition or a QR decomposition. In addition, Equation (2) and Equation (3) need pixel-wise exponential and logarithm operations. Therefore, the computational complexity becomes the main issue for built-in HDR features, which complexity makes HDR video impossible.

Moreover, the conventional methods for HDR imaging based on the "Red, Green, Blue" (RGB) color space contain several disadvantages. Firstly, because all RGB channels are correlated to the luminance, the estimation of camera response function has to take under all three channels, and is therefore computationally expensive. Secondly, sampling is difficult to cover the range of gray scales. Sampling bias may decrease the performance of the estimation. Thirdly, chromatic noises in low lights may decrease the performance of the estimation. Finally, the tone mapping may lead to color distortion, such as white unbalancing.

Therefore, there is a need for a system and method for combining a set of images into a blended HDR image in a time and cost efficient manner while preserving the quality for HDR imaging.

SUMMARY

This disclosure presents a method and apparatus for high dynamic range imaging. Based on the derivation, this disclosure points out that the recovery of the high dynamic range radiance maps used by the previous methods can be waived. The luminance channel is fast computed by combining different exposures with respective blending curves. It saves a large amount of computational resources compared with the existing methods. Performed on the yellow-luminance (Y), blue-luminance (U) and red-luminance (V) (YUV) color space, the proposed scheme does not require extra post-processing steps to overcome the problems such as chromatic misbalancing and luminance artifacts suffered by previous methods.

In accordance with a first aspect of the subject matter disclosed herein, a method for high dynamic range (HDR) imaging is provided. The method comprises: calculating weights of Y components of a set of images in YUV color space based on a set of lookup tables (LUTs); blending Y components of the set of images with the weights to generate blended Y components; and combining the blended Y components with corresponding UV components to generate a single image in YUV color space.

In accordance with some embodiments, the method further comprises initializing the set of lookup tables (LUTs) based on exposure configurations of the set of images for HDR imaging.

In accordance with some embodiments, the method further comprises exposing the set of images in RGB color space with the different exposure configurations, so each image has a unique exposure configuration; and converting the set of images from RGB color space into YUV color space before said calculating.

In accordance with some embodiments, the method further comprises averaging values of UV components of the set of images in the YUV color space to achieve averaged UV components.

In accordance with some embodiments, the combining comprises combining the blended Y components with the averaged UV components to generate a single HDR image in YUV color space.

In accordance with some embodiments, the method further comprises converting the single HDR image from YUV color space into RGB color space to generate an HDR image in RGB color space.

In accordance with some embodiments of the method, the calculating weights of Y components comprises calculating the weight for the Y component of each image with one function selected from a plurality of functions based on the exposure configuration of the image.

In accordance with some embodiments of the method, the calculating weight of the Y component of each image with one function selected from a plurality of functions based on the exposure configuration of the image comprises: applying to the Y component of a maximum underexposed image with a first modified sigmoid function; applying to the Y component of a normal exposed image with a derivative of the first modified sigmoid function; applying to the Y component of a maximum overexposed image with a second modified sigmoid function.

In accordance with some embodiments of the method, the calculating the weight of the Y component of each image with one function selected from a plurality of functions based on the exposure configuration of the image further comprises applying to the Y component of an underexposed image with a first interpolated function between the first modified sigmoid function and the derivative of the first modified sigmoid function; and applying to the Y components of an overexposed image with a second interpolated function between the derivative of the first modified sigmoid function and the second modified sigmoid function.

In accordance with some embodiments of the method, the applying to the Y component of a maximum underexposed image comprises applying a function of $S(x, a)$ to the Y components of the maximum underexposed image; the applying to the Y component of a normal exposed image comprises applying a function of $$S'(x, a)^{\frac{|x-127|}{255}}$$

to the Y components of a normal exposed image; and the applying to the Y components of a maximum over exposed image comprises applying a function of $S(255-x, a)$ to the Y component.

In accordance with some embodiments of the method, the applying to the Y component of an underexposed image function comprises applying a function of $$aS(x, a) + (1-\alpha)S'(x, a)^{\frac{|x-127|}{255}}$$

to the Y components; and applying to the Y component of an overexposed image comprises applying a function of $$\beta S(255-x, a) + (1-\beta)S'(x, a)^{\frac{|x-127|}{255}}$$

to the Y component.

In accordance with some embodiments, the factor $\alpha$ is within a range of $[0, 1]$ and the factor $\beta$ is within a range of $[0, 1]$.

In accordance with some embodiments, the method further comprises smoothing the calculated weights of Y component.

In accordance with some embodiments of the method, the smoothing comprises applying a Gaussian filter with the calculated weights of Y component.

In accordance with some embodiments of the method, the averaging the UV components comprises applying an average calculation $$UV(x, y) = \frac{\sum_{j=1}^{P} UV_j(x, y)}{P}$$

to each UV component of the set of images.

In accordance with a second aspect of the subject matter disclosed herein, an imaging camera with high dynamic range imaging capacity is provided. The camera is provided with an HDR module for performing the method of any of the methods described in any of the above embodiments.

BRIEF DESCRIPTION OF THE DRAWINGS

FIG. 15, FIG. 16 and FIG. 17 are examples of the HDR imaging using the proposed method, wherein sets of three images (−1EV, 0EV, +1EV) are used to generate HDR images.

Figure 1:
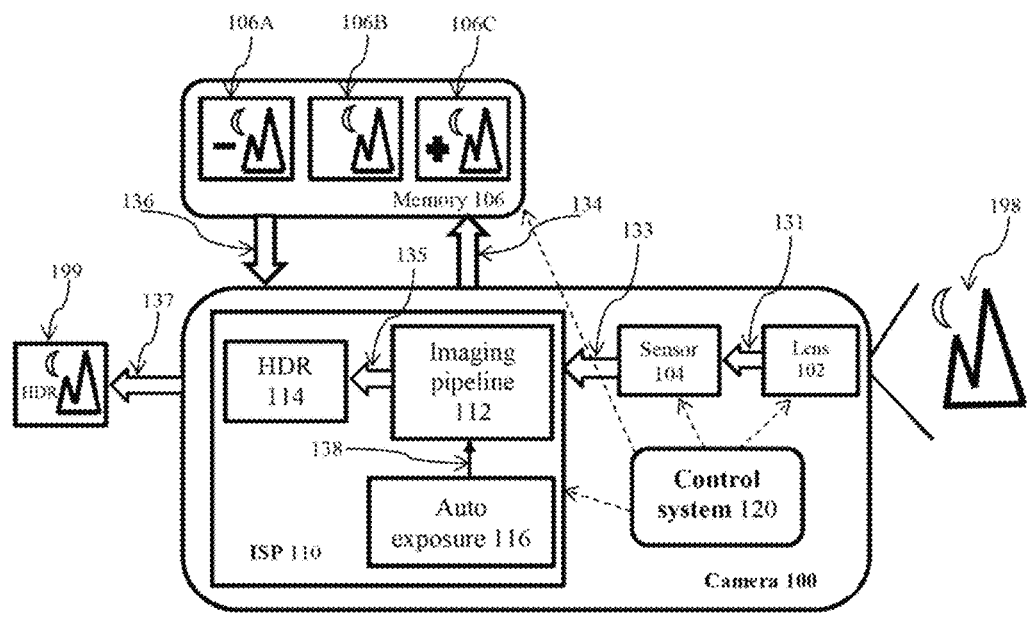
FIG. 1 is an exemplary top-level module diagram illustrating an embodiment of a camera with HDR capability, wherein the camera is used to take an HDR image.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION

The present disclosure sets forth a system and method for fast adaptive blending for high dynamic range imaging. Although generally applicable to any image taking devices that are capable of taking a set of images with differently specified exposures for high dynamic range imaging, the system and method will be shown and described with reference to a camera capable of taking a set of images with incremental exposure levels from underexposure to overexposure for illustrative purpose only.

Figure 14A:
FIG. 14 is shows a set of three images with three exposures: −1EV (FIG. 14A), 0EV (FIG. 14B), +1EV (FIG. 14C) and their corresponding visualized weights shown in FIG. 14D, FIG. 14E and FIG. 14F respectively.
Figure 14B:
Figure 14C:
Figure 14D:
Figure 14E:
Figure 14F:
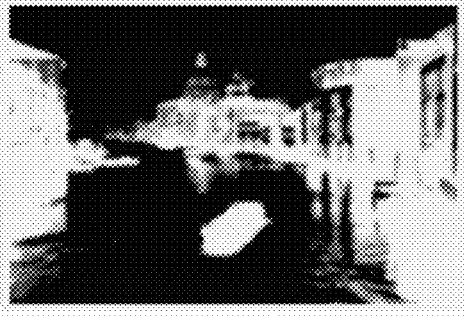

To illustrate the purpose of the system and method disclosed herein, FIG. 14 presents an example of a set of three images with incremental exposures (−1EV, 0EV, +1 EV) with FIG. 14A, FIG. 14B and FIG. 14C, respectively. Each of the three images captures details of certain portion(s) of a scene, e.g. a sky of the scene is captured in FIG. 14A, a river of the scene is captured in FIG. 14B, and buildings and a boat of the scene are captured in FIG. 14C. The purpose of the system and method is to combine the three images with different exposures into one HDR image which preserves the portions carrying those details in each of the three images.

FIG. 1 illustrates a camera 100 for achieving the above described purpose for HDR imaging. The camera 100 is shown in FIG. 1 as having a lens 102 for receiving light that represents a scene 198. The light received via the lens 102 is provided to a sensor 104 through light signal 131 for generating dataflow 133, which represents the image signals of the scene 198. The dataflow 133 is transferred to an imaging pipeline 112 of an image signal processor (ISP) 110. The image signal processor (ISP) 110 includes a chip with an HDR module 114. An auto exposure module 116 of the image signal processor 110 controls the exposures of each image generated and stored in a memory 106. As shown in FIG. 1, for example, a set of three images with an underexposed image 106A, a normal exposed image 106B and an overexposed image 106C: can be generated by the sensor 104 and the image signal processor 110. The set of three images are stored in the memory 106. The set of images are then pipelined by an imaging pipeline 112 to an HDR module 114, which combines the set of images to generate a single HDR image. The set of pipelined images includes exposure configurations for each of the images. Therefore, the purpose of the HDR module 114 is to take a set of images representing a particular scene as well as their exposure configurations and to generate a single HDR image 199.

Figure 2:
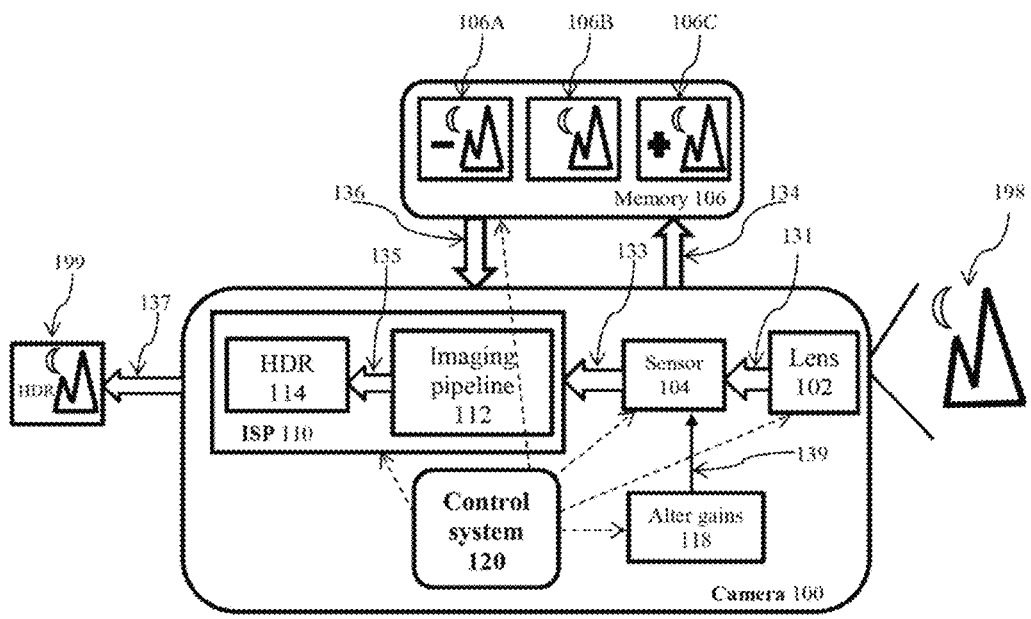
FIG. 2 is an exemplary top-level module diagram illustrating an alternative embodiment of the camera of FIG. 1, wherein the camera is used to take an HDR video.

Similarly, to take an HDR video, a camera 100 is shown in FIG. 2 as having a lens 102 for receiving light that represents a scene 198. The light received via the lens 102 is provided to a sensor 104 for generating dataflow 131, which represents a flow of continuous set of images. A control system 120 alters the gain value of the sensor 104 via an alter gains module 118 to get a set of images with different exposures for a particular frame in the video. As illustrated in FIG. 2, for example, a set of three images with an underexposed image 106A, a normal exposed image 106B and an overexposed imaged 106C can be generated for each frame of the video in a memory 106 of the camera via dataflow 134. The control system 120 controls a dataflow 136 from the memory 106 by an imaging pipeline 112. The set of pipelined images include the three images and the exposure configurations for each of the images. The pipelined images are provided to an HDR module 114 of an ISP 110 via dataflow 135. The HDR module 114 then combines the set of images for the particular frame in view of the exposure configurations to generate a single HDR image 199 which represents the frame of the video. Each frame, an HDR image 199, in the video is processed as described to generate continuous flow of HDR images, or frames, representing a video clip.

Although the configurations in FIG. 1 and FIG. 2 are shown and described as providing HDR imaging based upon sets of three images for a purpose of illustration only, the method disclosed herein is suitable for use with any number of images. The disclosed method typically is used with odd numbers of HDR images. For example, the method disclosed herein can be applied to sets of five or more images with different exposure values for HDR image. In a typical exposure configuration for HDR imaging with an auto exposure bracketing (AEB), an exposure bracketing is used when exposing a scene 198. Although the exposures can be taken in any suitable order (or sequence), a normal exposure typically is determined first. Then, based on the selected normal exposure, a plurality of images is taken with exposure compensations in a constant interval in both positive and negative directions to form a sequence of images, which includes an image with the normal exposure. The exposure values of the sequence of images form an arithmetic sequence. For example, for a sequence of five images, the normal exposure value can be set to 0EV, and the constant interval for the exposure compensations is selected as 1. Then, the exposure values of the sequence of images can be (−2EV, −1EV, 0EV, +1EV, +2EV). In the same example, if the interval constant is selected as 2, the exposure values of the sequence of images can be (−4EV, −2EV, 0EV, +2EV, +4EV). In other words, the interval constant can comprise any suitable number for generating the sequence of images.

Same concept applies to sequences of seven or more images. In a sequence of seven images, if the normal exposure value is set to 0EV and the interval constant is selected as 1, the exposure values of the sequence of images can be (−3EV, −2EV, −1EV, 0EV, +1EV, +2EV, 3EV). Similarly, if the interval constant is selected as 2, the sequence would become (−6EV, −4EV, −2EV, 0EV, +2EV, +4EV, 6EV). For the purpose of this disclosure, a sequence of images is equivalent to a set of images.

Figure 3:
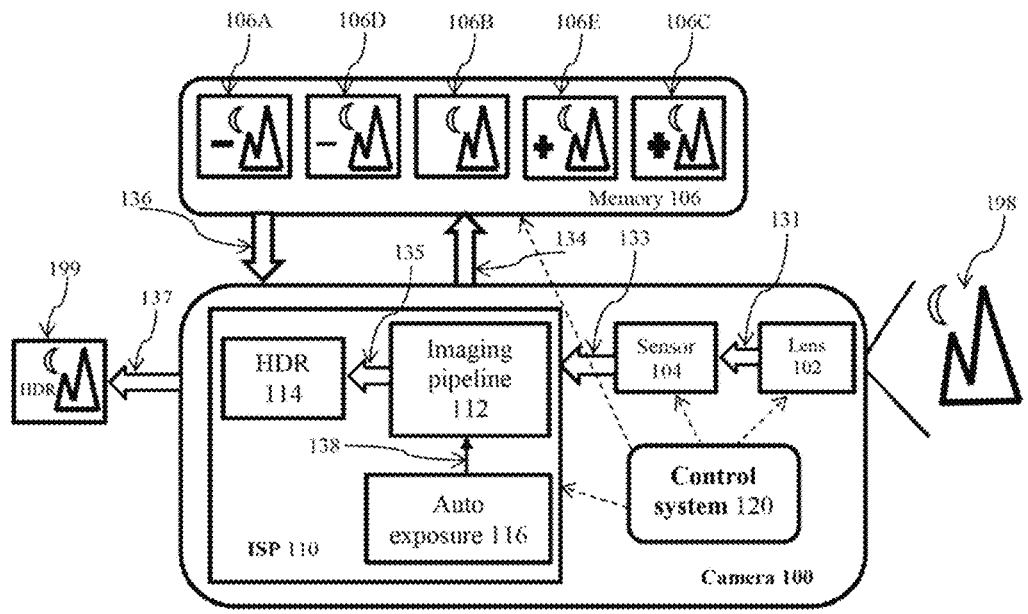
FIG. 3 is an exemplary top-level module diagram illustrating another alternative embodiment of the camera of FIG. 1, wherein a set of five images with different exposures are taken for HDR imaging.
Figure 4:
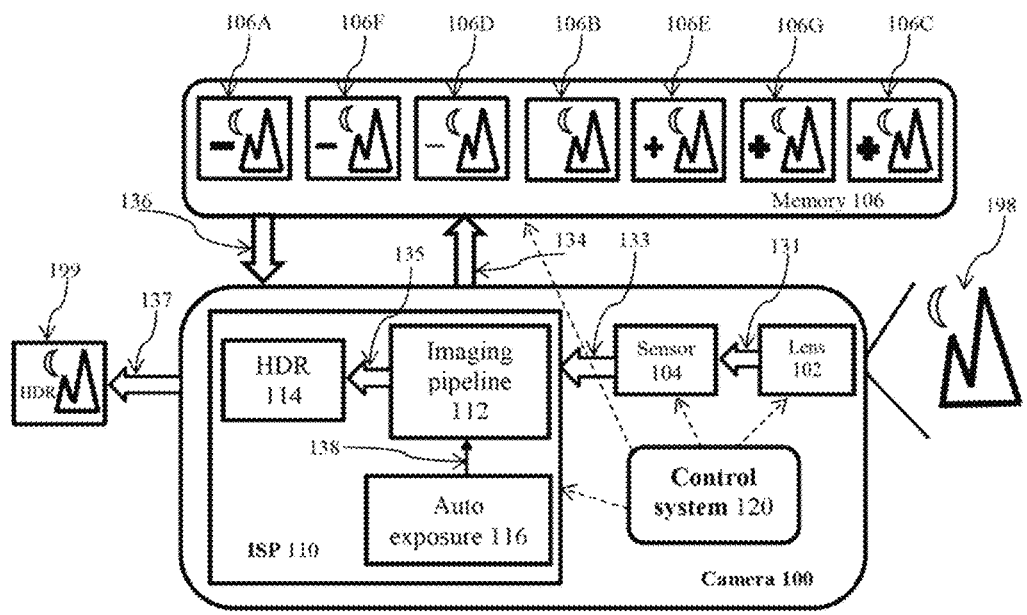
FIG. 4 is an exemplary top-level module diagram illustrating yet another alternative embodiment of the camera of FIG. 1, wherein a set of seven images with different exposures are taken for HDR imaging.

FIG. 3 shows the camera 100 taking an HDR image with a set of five images with exposure configurations in a manner as described in the preceding paragraphs. The set of five images includes two underexposed images 106A, 106D, a normal exposed image 106B and two overexposed imaged 106E, 106C. The exposure values of 106A, 106D, 106B, 106E and 106C form an arithmetic sequence as described above. FIG. 4 shows the camera 100 taking an HDR image with a set of seven images including three underexposed images 106A, 106F, 106D, a normal exposed image 106B and three overexposed imaged 106E, 106G, 106C. Processes shown in FIG. 3 and FIG. 4 are same with the process shown in FIG. 1 except the number of images in a set for HDR imaging. The exposure values of 106A, 106F, 106D, 106B, 106E, 106G, and 106C form an arithmetic sequence.

Figure 5:
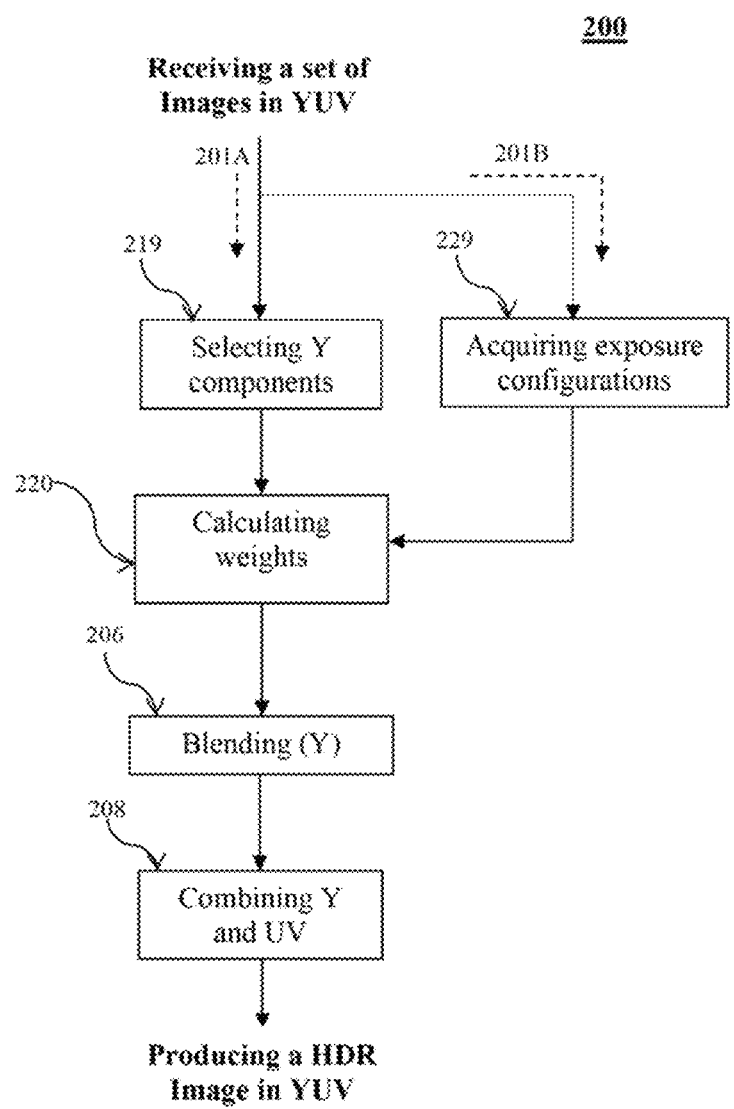
FIG. 5 is an exemplary flowchart illustrating the embodiment of a method of implemented with the HDR module shown in FIG. 1 or FIG. 2, wherein the method includes combining a set of images in YUV color space into one HDR image.

Now, one manner by which the camera 100 processes HDR images is illustrated with FIG. 5, which shows an embodiment of a method 200 performed by the HDR module 114 (shown in FIG. 1 and FIG. 2). In FIG. 5, the method 200 provides two processing branches for processing the set of images: a first processing branch 201A processes the Y components of the set of images, and a second branch 201C acquires exposure configurations of the set of images. When the HDR module 114 (shown in FIG. 1 and FIG. 2) receives a set of images in YUV color space along with their exposure configurations, the HDR module 114 selects, at 219, the Y component for each image selected from the set of images. Then, at 220, the HDR module 114 calculates a weight for each Y component of the set of images by conditioning the weight calculations with the exposure configurations, which are acquired at 229. The weight calculation of 220 will be discussed in FIG. 8, FIG. 9, FIG. 10 and FIG. 11.

Based on the weights calculated at 220, the HDR module 114 blends the Y component for each image of the set of images to generate one blended (or composite) Y component, at 206. Then, the HDR module 114, at 208, combines the blended Y components with corresponding UV components of the set of images to produce an HDR image in YUV color space.

Figure 6:
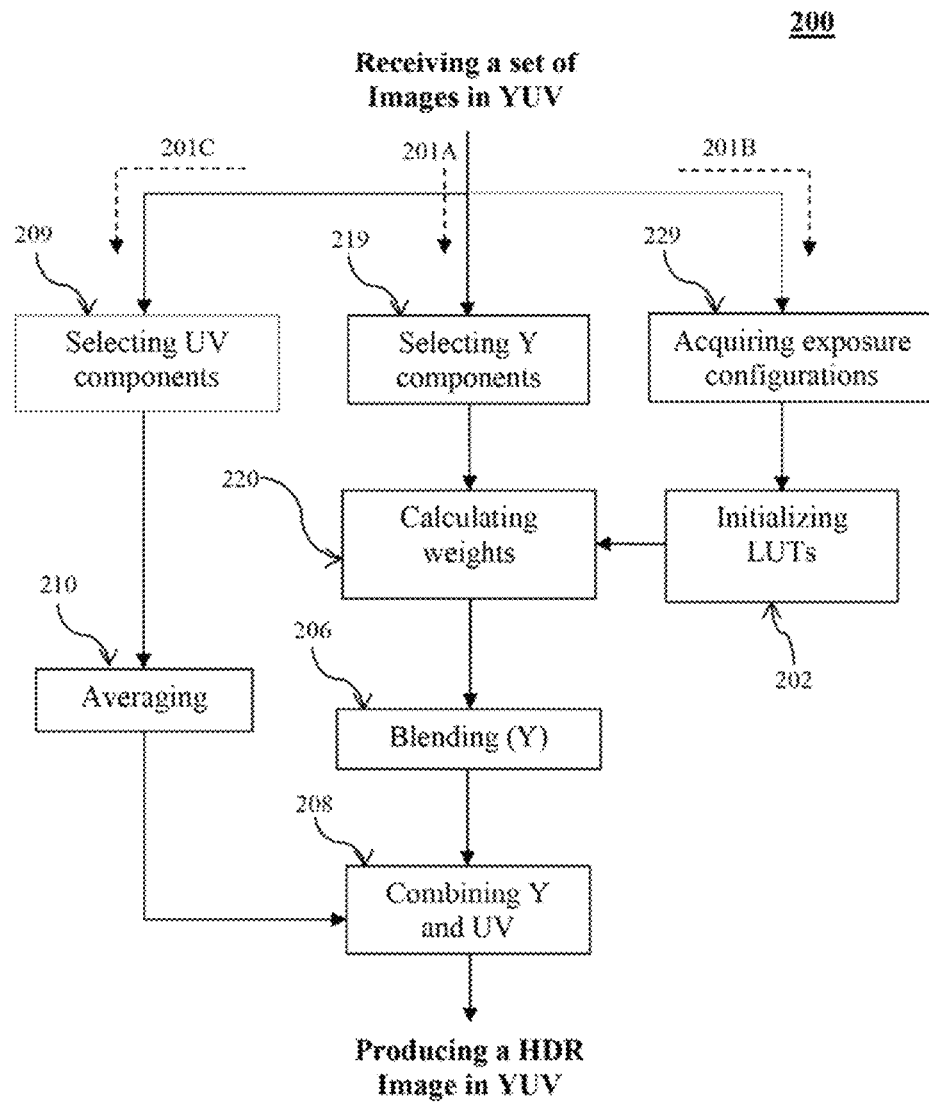
FIG. 6 is an exemplary flowchart illustrating an embodiment of the method of FIG. 5, wherein the method includes averaging UV components of the set of images and initializing LUTs for the exposure configurations.

Another embodiment of method 200 in FIG. 5 is further illustrated with FIG. 6. In order to process a set of images in YUV color space taken for a HDR image, the method 200 provides three processing branches for processing the set of images: a first processing branch 201A processes the Y components of the set of images, a second processing branch 201C processes exposure configurations of the set of images, and a third processing branch 201B processes the UV components of the set of images. When the HDR module 114 (shown in FIG. 1 and FIG. 2) receives a set of images in YUV color space along with their exposure configurations, the HDR module 114 initializes a look up table (LUT), at 202, for each exposure configuration of one image selected from the set of images. Then, at 220, similar to FIG. 2A, the HDR module 114 calculates a weight for each Y component of the set of images by conditioning the weight calculations with the exposure configurations. Based on the weights calculated at 220, the HDR module 114 blends the Y component for each image of the set of images to generate one blended (or composite) Y component, at 206.

In the processing branch 201A of the method 200, the HDR module 114 selects, at 209, the UV components of the same set of images and, at 210, calculates an average of the values of selected UV components among the images to generate averaged UV components. At 208, the HDR module 114 combines the blended Y component and the averaged UV components to generate a single HDR image in YUV color space.

Figure 7:
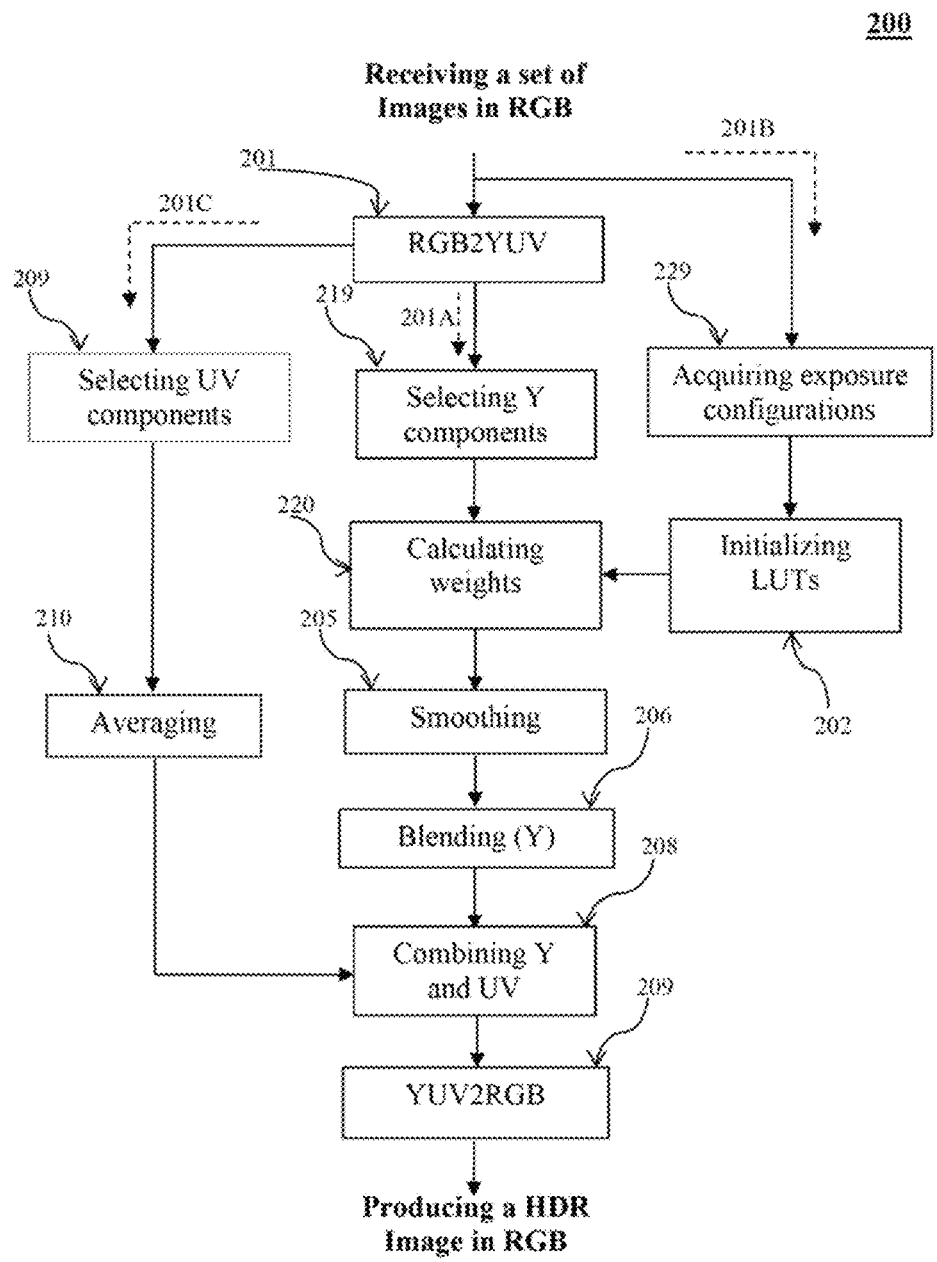
FIG. 7 is an exemplary flowchart illustrating an embodiment of the method of FIG. 5 or FIG. 6, wherein the method includes combining a set of images in RGB color space into an HDR image in RGB color space.

In another embodiment of the method 200, as shown in FIG. 7, the HDR module 114 processes a set of images for HDR imaging in red-blue-green (RGB) color space. Similar to what is described for FIG. 6, the method 200 also provides three processing branches for processing the set of images: a first processing branch 201A processes the Y components of the set of images, a second processing branch 201B processes the UV components of the set of images, a third processing branch 201C processes exposure configurations of the set of images. In the manner set forth above with reference to FIG. 6, the HDR module 114 initializes a look up table (LUT), at 202, for each exposure configuration of one image selected from the set of images. Unlike described in FIG. 6, the HDR module under this embodiment converts the set of images from RGB color space into YUV color space, at 201, before calculating weight of the Y component for each image of the set of images. Any conventional method available in the art for converting RGB to YUV can be used at 201.

After converting from RGB to YUV color space, the HDR module 114 calculates weight for the Y component for each image selected from the set of images in YUV color space. Similar to what is described in FIG. 5 and FIG. 6, the HDR module 114 calculates weights, at 220, by conditioning the weight calculations with the exposure configurations. In addition to what is described in FIG. 5 and FIG. 6, the HDR module 114 performs a smoothing operation to reduce potential artifacts, at 205. After smoothing at 205, the HDR module 114 blends the Y component for each image of the set of images to generate one blended Y component, at 206.

In the manner discussed above with reference to FIG. 6, the HDR module 114 takes UV components of the same set images to average the values of UV components to generate average UV components, at 210. At 208, the HDR module 114 combines the blended Y component and the averaged UV components to generate a single HDR image in YUV color space. At last, the HDR module 114 converts the combined YUV color space to RGB color space at 209 to generate an HDR image.

The above embodiments of a method 200 are developed based on further deductions of Equation (3) of the existing methods for HDR imaging described in the background session. In one embodiment, the methods 200 of FIG. 5, FIG. 6 and FIG. 7, can be implemented by rewriting Equation (3) to:

$$L(x, y) = f(lnE(x, y)) = f\left(\frac{\sum_{j=1}^{P}(w(Z_j(x, y))(g(Z_j(x, y)) - lnk_j)}{\sum_{j=1}^{P} w(Z_j(x, y))}\right).$$

In this embodiment, the method 200 eliminates the tone mappings, as described for Equation (2) and Equation (3). In traditional HDR methods, those tone mappings are performed after the recovery of the radiance maps, and hence make such a recovery computationally expensive. This disclosure assumes a f(X) meets the property to meet an approximation such that:

$$L(x, y) = f\left(\frac{\sum_{j=1}^{P}(w(Z_j(x, y))(g(Z_j(x, y)) - lnk_j)}{\sum_{j=1}^{P} w(Z_j(x, y))}\right) \approx \quad \text{Equation (4)}$$

$$\frac{\sum_{j=1}^{P} w(Z_j(x, y))f(g(Z_j(x, y)) - lnk_j)}{\sum_{j=1}^{P} w(Z_j(x, y))}$$

Generally, it is reasonable to assume $f(g(Z_j(x, y)) - \ln k_j) = Z_j(x, y) + \delta_j$ wherein $\delta_j$ is small in normal exposure, positive in under exposure and negative in over exposure. Hence, Equation (4) can be rewritten as Equation (5):

$$L(x, y) = \frac{\sum_{j=1}^{P} w(Z_j(x, y))Z_j(x, y)}{\sum_{j=1}^{P} w(Z_j(x, y))} + \frac{\sum_{j=1}^{P} w(Z_j(x, y))\delta_j}{\sum_{j=1}^{P} w(Z_j(x, y))} \approx \quad \text{Equation (5)}$$

$$\frac{\sum_{j=1}^{P} w(Z_j(x, y))Z_j(x, y)}{\sum_{j=1}^{P} w(Z_j(x, y))} + \in$$

where $\in$ is a distortion associated with parameter $\delta_j$. If we assume the set of exposures is symmetric and the scene 198 covers a large range of gray scales, $E(\in)=0$ and distortion e can be omitted. Therefore, the HDR imaging can be simplified to a blending of different exposures.

Different from the previous methods described in the background session, the weighting function used in this disclosure takes the exposure configurations associated with the images into account. Mathematically, $w(Z_j(x,y))$ is replaced by $w(Z_j(x,y), k_j)$. Let $$S(x, a) = \frac{1}{1 + e^{-ax}}$$

be a modified sigmoid function, the proposed weighting functions are defined in Equation (6A), when there are three images selected as one underexposed, one normal exposed and one overexposed:

$$W(x, k_j) = \begin{cases} S(x, a) & \text{maximum under exp.} \\ S'(x, a)^{\frac{|x-127|}{255}} & \text{normal exp.} \\ S(255 - x, a) & \text{maximum over exp.} \end{cases} \quad \text{Equation (6A)}$$

where S'(x, a) is the derivative of S(x, a), and a is used to control the shape of curves.

Figure 8:
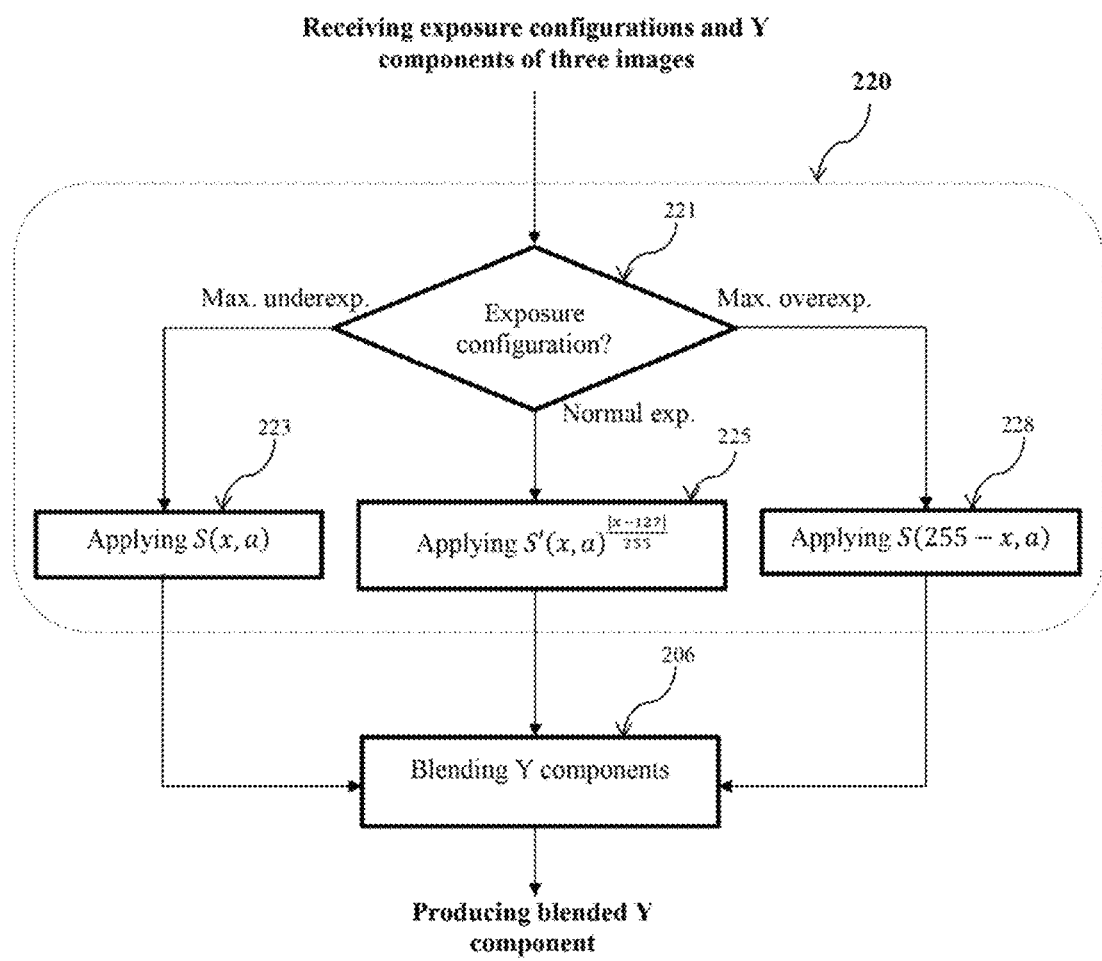
FIG. 8 is an exemplary flowchart illustrating an alternative embodiment of the methods of FIG. 5, FIG. 6 or FIG. 7, wherein the methods include implementing a weight calculation.

One embodiment of a calculation based upon Equation (6A) is illustrated in FIG. 8. FIG. 8 is a flowchart that shows the details of one manner for a module calculating weights, at 220, a module blending Y components, at 206, as set forth above with reference to FIG. 6. At 221, a HDR module 114 (shown in FIG. 1 and FIG. 2) takes a set of three images: a maximum underexposed image 106A, a normal exposed image 106B and a maximum overexposed image 106C (collectively shown in FIGS. 1-2). Based on different exposure configuration of each image, the HDR module 114 can apply a different equation in calculating weights for each image selected from the set of three images. For the maximum underexposed image, the HDR module 114 applies a first modified sigmoid function, S(x, a), at 223. For the normal exposed image, the HDR module 114 applies a derivative of the first modified sigmoid function, $$S'(x, a)^{\frac{|x-127|}{255}},$$

at 225. For the maximum overexposed image, the HDR module 114 applies a second modified sigmoid function, S(255−x, a), at 228. The Y components for each of the images can be blended based on the calculated weights, at 206, to generate a blended Y component in the manner set forth above with reference to FIGS. 5, 6 and 7.

Based on the descriptions set above for Equation (6A), the calculation (6A) can be abstracted into:

$$\text{Weight} = \begin{cases} \text{first modified} & \text{maximum under exp.} \\ \text{sigmoid function} \\ \text{derivative of first} & \text{normal exp.} \\ \text{modified sigmoid} \\ \text{function} \\ \text{second modified} & \text{maximum over exp.} \\ \text{sigmoid function} \end{cases} \quad \text{Equation (6B)}$$

Figure 9:
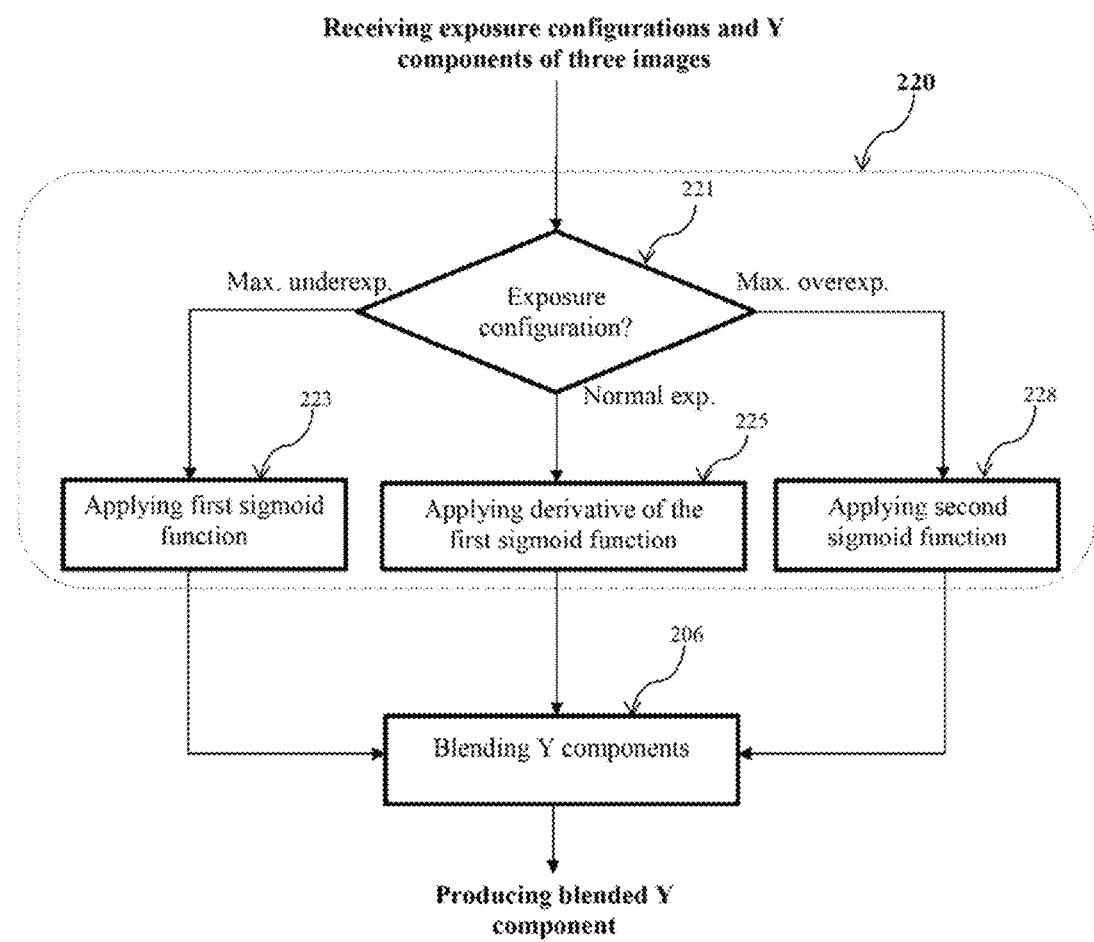
FIG. 9 is an exemplary flowchart further illustrating the embodiment of the method of FIG. 8, wherein the applicable equations for each module are illustrated.

An embodiment of the method according to Equation (6B) is illustrated in FIG. 9. When calculating the weights of Y component, the HDR module 114 under this embodiment applies a first modified sigmoid function for the maximum underexposed image, at 223, applies a directive of the first modified sigmoid function for the normal exposed image, at 225, and applies a second modified function for the maximum overexposed image, at 228.

Another embodiment of the method 200 includes processing of five images taken for HDR imaging. In this embodiment, the five images are taken with different, and normally symmetric, exposures: two underexposed images, one normal exposed image and two overexposed images, as the five images as described in FIG. 1 and FIG. 2 and as shown in FIG. 3. For the purpose of this embodiment, an image with least exposure is selected as a maximum underexposed image 106A (shown in FIG. 3); the normal exposed image is selected as a normal exposed image, 106B; an image with most exposure is selected as a maximum overexposed image, 106C. In addition, the other underexposed image is selected as an underexposed image, 106D, and the other overexposed image is selected as an overexposed image, 106E. One embodiment for providing weighting functions for the set of five images is set forth below with relation to Equation (7A).

$$w(x, k_j) = \begin{cases} S(x, a) & \text{maximum underexp.} \\ \alpha S(x, a) + \\ (1 - \alpha) S'(x, a)^{\frac{[x-127]}{255}} & \text{underexp.} \\ S'(x, a)^{\frac{[x-127]}{255}} & \text{normal exp.} \\ \beta S(255 - x, a) + \\ (1 - \beta) S'(x, a)^{\frac{[x-127]}{255}} & \text{overexp.} \\ S(255 - x, a) & \text{maximum overexp.} \end{cases} \quad \text{Equation (7A)}$$

where S'(x, a) is the derivative of S(x, a), and a is used to control the shape of curves. $\alpha, \beta$ are blending factors linearly proportional to the exposure values. Each of the factors $\alpha$ and $\beta$ is within a range of [0, 1].

Figure 10:
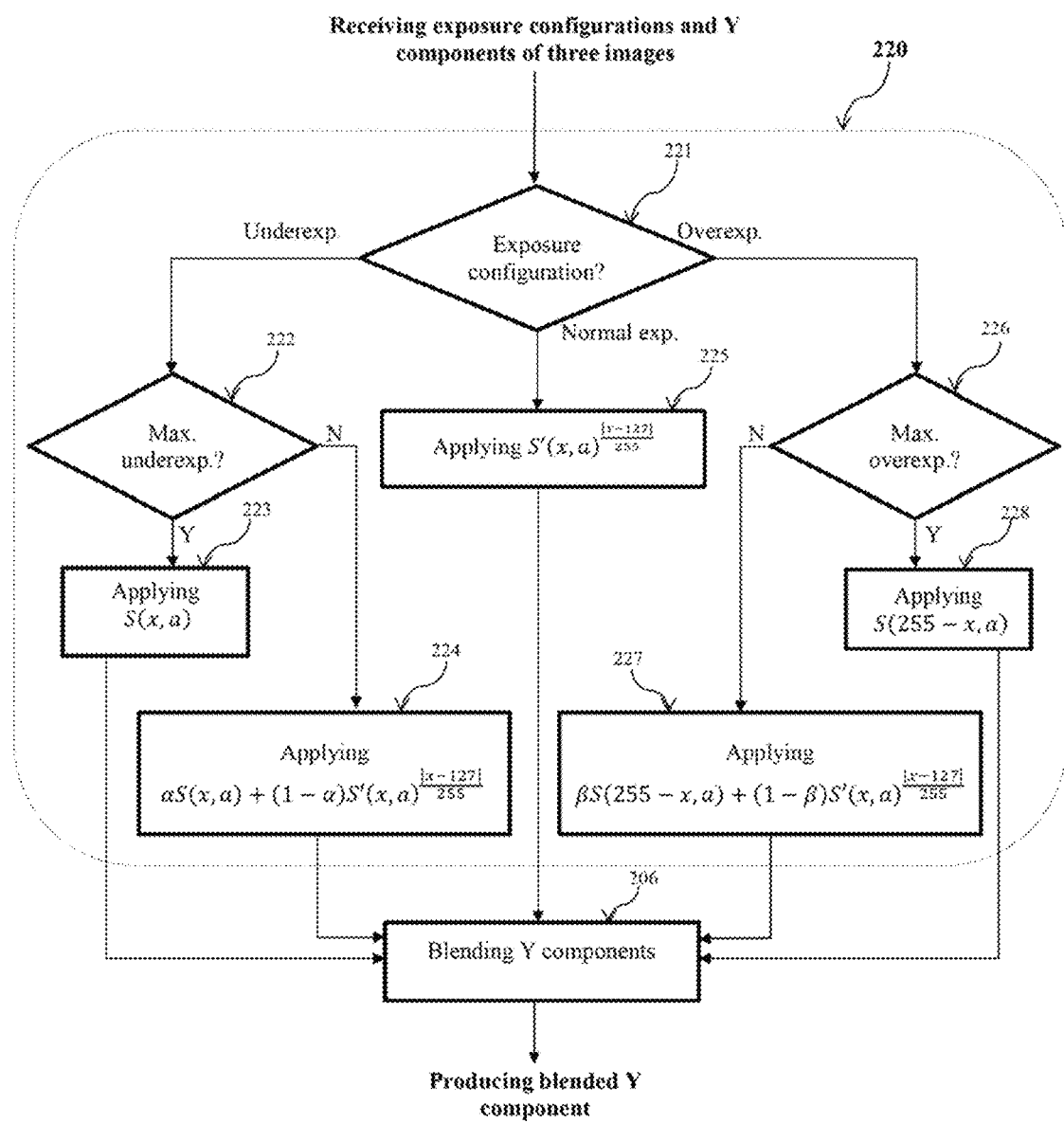
FIG. 10 is an exemplary flowchart further illustrating the embodiment of the method of FIG. 8, wherein five or more images are included in one set of images for an HDR image.

An embodiment of one method 220 for calculating the weights to be applied to Y components in accordance with Equation (7A) is shown in FIG. 10. In FIG. 10, the HDR module 114 (shown in FIGS. 1 to 2) takes a set of five images for HDR image. In addition to the three images described in FIG. 8, FIG. 10 has one underexposed processing module 224 between the maximum underexposed processing module 223 and the normal exposed processing module 225. Also, FIG. 10 has one overexposed processing module 227 between the normal exposed module 225 and the maximum overexposed processing module 228. For the underexposed image 106D, at 224, the HDR module 314 applies a first interpolated function $$\alpha S(x, a) + (1 - \alpha) S'(x, a)^{\frac{[x-127]}{255}},$$

which is an interpolation function of the first modified sigmoid function S(x, a) and the derivative of the first modified sigmoid function $$S'(x, a)^{\frac{[x-127]}{255}}.$$

For the overexposed image 106E, at 227, the HDR module 114 applies a second interpolated function $$\beta S(255 - x, a) + (1 - \beta) S'(x, a)^{\frac{[x-127]}{255}},$$

which is an interpolation function of the derivative of the first modified sigmoid function $$S'(x, a)^{\frac{[x-127]}{255}}$$

and the second modified sigmoid function S(255−x, a). The Y components for each of the five images are blended based on the calculated weights at 206 to generate a blended Y component.

The calculation (7A) can be abstracted into:

$$\text{Weight} = \begin{cases} \text{first modified} & \text{maximum underexp.} \\ \text{sigmoid function} \\ \text{first interpolated} & \text{underexp.} \\ \text{function} \\ \text{derivative of first} & \text{normal exp.} \\ \text{modified sigmoid} \\ \text{function} \\ \text{second interpolate} & \text{overexp.} \\ \text{function} \\ \text{second modified} & \text{maximum overexp.} \\ \text{sigmoid function} \end{cases} \quad \text{Equation (7B)}$$

Figure 11:
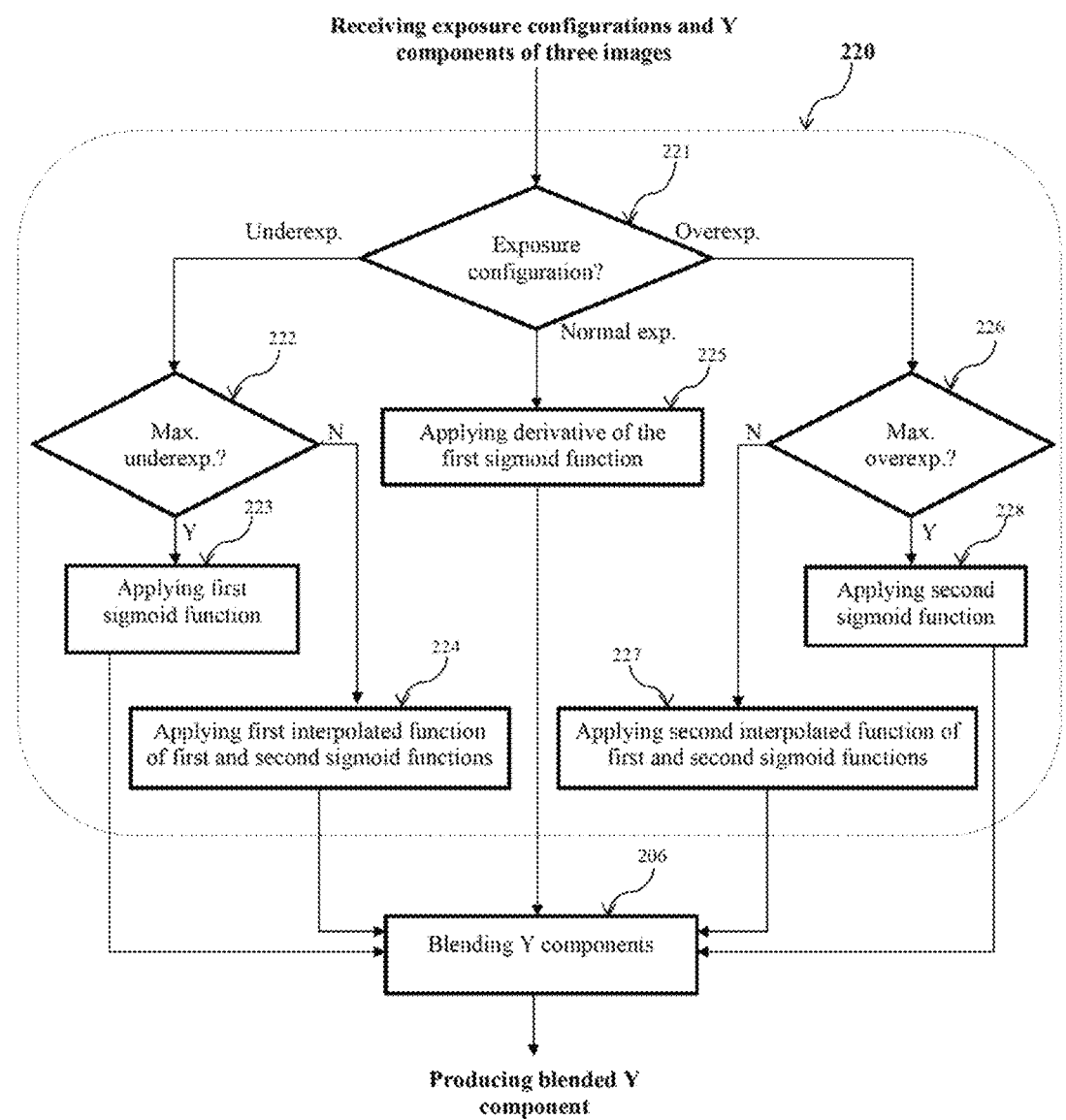
FIG. 11 is an exemplary flowchart further illustrating the embodiment of the method of FIG. 10, wherein the applicable equations for each module are illustrated.
Figure 12:
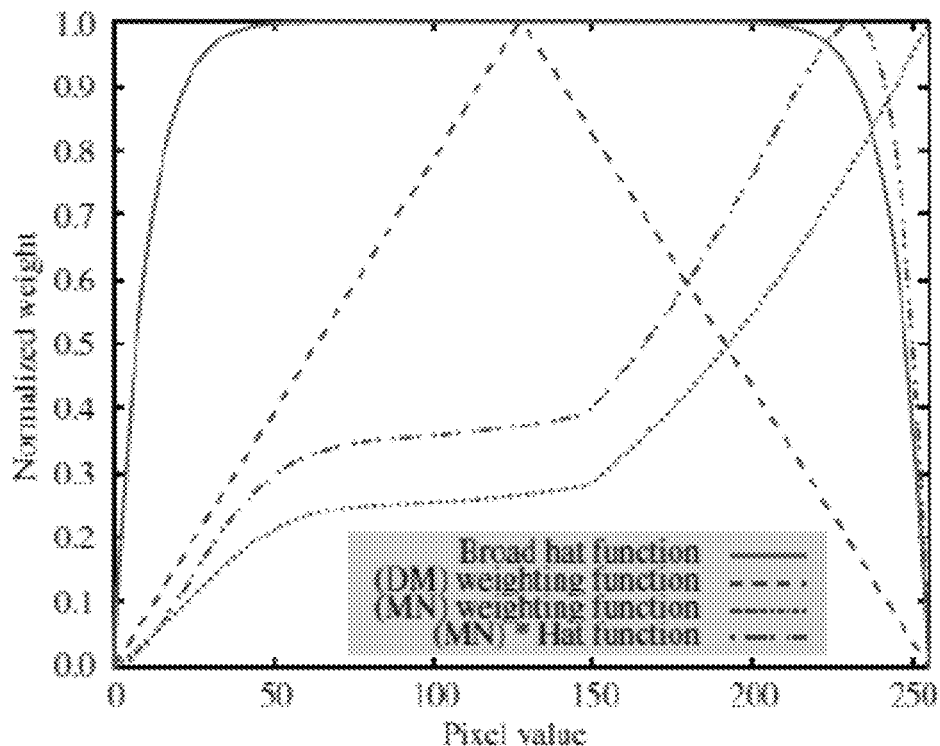
FIG. 12 is a curve diagram showing the blending curves for typical weighting functions used by traditional methods for HDR imaging.

An embodiment of a method 220 according to (7B) is illustrated in FIG. 11. In this embodiment, the weights for the maximum underexposed image 106A, normal exposed image 106B and maximum overexposed image 106C can be calculated in the manner set forth above with reference to FIG. 9. For the underexposed image 106D, the HDR module 114 applies the interpolated function as set forth above with reference to FIG. 9. For the overexposed image 106E, the HDR module 114 applies a second interpolated function as set forth above with reference to FIG. 9. The Y components for each of the five images are blended based on the calculated weights, at 206, to generate a blended Y component.

Even though the embodiments in FIG. 10 and FIG. 11 are illustrated with a set of five images, sets of seven or more images (normally in odd numbers) can also be processed with a method 200. In a first exemplary embodiment for processing a set of seven images, the seven images are exposed in the manner set forth above with reference to FIG. 1-FIG. 4.

For the purpose of this embodiment, the maximum underexposed image, the normal exposed image and the maximum overexposed image can be selected as described with reference to FIG. 10 and FIG. 11. One of the two images between the maximum underexposed image and the normal exposed image can be selected as an under exposed image 106D, and one of the two images between the normal exposed image and the maximum overexposed image can be selected as the over exposed image 106E. The under exposed image 106D and the over exposed image 106E are normally selected symmetric with relative to the normal exposed image 106B. The other two images, which are not selected, are ignored in this embodiment. The weight calculations of the selected images can be determined in the manner set forth above with reference to FIG. 10 and FIG.

11. The Y components of the selected images for weight calculations are blended at 206 to generate a blended image.

A process of sets of seven or more images is also available with another embodiment of a method 220. Under an embodiment to process a set of seven images, the exposure configurations and the selections the maximum underexposed image 106A, the normal exposed image 106B and the maximum overexposed image 106C are same as described with reference to the first exemplary embodiment for processing a set of seven images. Under this embodiment, the two underexposed images (106F, 106D) between the maximum underexposed image 106A and the normal exposed image 106B are both selected as underexposed images. The two overexposed images (106E, 106G) between the normal exposed image 106B and the maximum overexposed image are selected as overexposed images.

In accordance with the same embodiment, when applying Equation (7A) for the under exposed images and the overexposed images, a simple exemplary way to determine the factor α is to calculate it with a fraction of each exposure compensation value to a sum of all under exposure compensations except the maximum exposure (or over exposure compensation values except the maximum exposure). E.g. in an exposure sequence of (3EV, −2EV, −1EV, 0EV, +1EV, +2EV, 3EV) corresponding to images 106A, 106F, 106D, 106B, 106E, 106G and 106C, the sum of all under exposure compensations except the maximum exposure 106F, 106D is −3 and the exposure compensation value for 106F is −2; therefore, the factor α is two third ⅔. When calculating weights for 106F, Equation (7A) becomes:

$$S(x, a) \times \frac{2}{3} + S'(x, a)^{\frac{[x-127]}{255}} \times \frac{1}{3}$$

The exposure compensation value for 106D is −1; therefore, the factor α is one third ⅓. When calculating weights for 106F, Equation (7A) becomes:

$$S(x, a) \times \frac{1}{3} + S'(x, a)^{\frac{[x-127]}{255}} \times \frac{2}{3}$$

Same approach applies to the overexposed images 106E and 106G. In this embodiment, Y components of all seven images in the set are blended at 206.

The blending schemes at 206 based on Equations (6A) to (7B) may produce artifacts to the blended Y component, particularly, when the contrast of the scene 198 is particularly high. One embodiment of the method 200 can include operations for smoothing the weights calculated in an effort to reduce the artifacts. The operations for smoothing weights (shown in the FIG. 7) can happen after one or more of the weight calculations, such as 223, 225 and 228 in FIG. 8 and FIG. 9, and 223, 224, 225, 227 and 228 in FIG. 10 and FIG. 11, and before the blending operation at 206 in FIGS. 8 to 11. As an exemplary example, a Gaussian filter can be used for smoothing calculated weights to reduce or even overcome the artifacts at blending.

As described above, in order to avoid losses of image qualities and to speed up HDR imaging process, the embodiments of the proposed method processes images in YUV color space. Only Y component is taken to calculate the dynamic range. For UV components, all ordinary combining methods can be used. In one embodiment of the method 200, the UV components are combined with simple average calculations as shown in Equation (8), $$UV(x, y) = \frac{\sum_{j=1}^{P} UV_j(x, y)}{P}.$$

Equation (8)

Referring back to FIG. 6 and FIG. 7, the UV components of the set of images being processed are simply averaged at 210. After the averaging operations at 210, the UV components are combined with the blended Y component at 208 to generate a single HDR image at 208.

Figure 13:
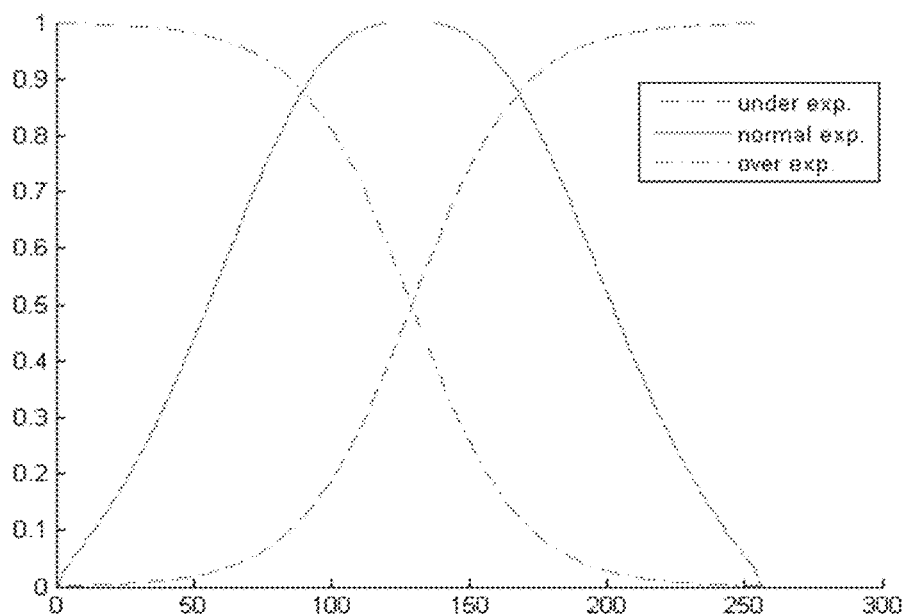
FIG. 13 is a curve diagram showing the blending curves for the weighting functions when a=−0.05 for an embodiment of the method disclosed herein.

A typical example diagram showing weight curves for a maximum underexposed image, a normal exposed image and a maximum overexposed image under one embodiment of the method 200 is illustrated in FIG. 13.

FIG. 14 presents an example to visualize the weights of three images with three exposures (−1EV, 0EV, +1EV) as well as the final result. FIG. 14 shows a set of three images for HDR image with FIG. 14A being the underexposed image, FIG. 14B being the normal exposed image and FIG. 14C being the overexposed image. On the right-hand side of FIG. 14, FIG. 14D visually shows the weights of FIG. 14A in a blending scheme under a method 200; FIG. 14E visually shows the weights of FIG. 14B in the blending scheme; and FIG. 14F visually shows the weights of FIG. 14C in the blending scheme. The bright regions of the right-hand images denote larger weights to the same regions of the left-hand images, for examples, the sky of FIG. 14A, the river of the middle-left image, and the buildings and the boat of FIG. 14C.

The visualized weights of FIG. 14 show that the all of the details of the scene 198 (shown in FIGS. 1 and 2) have been captured with the combination of the three images with the method 200 (shown in FIG. 8 and FIG. 9). For examples, the underexposed image in FIG. 14A captures the details of brightest portion of the scene, which portion is the sky. FIG. 14D shows that the sky portion of FIG. 14A is given bigger weights in relative to other portion of the image. Similarly, the normal exposed image in FIG. 14B captures the details of the river, and FIG. 14E shows the river portion of FIG. 14B is given bigger weights. The overexposed image in FIG. 14C captures the details of darkest portions, which are the buildings and the boat, and FIG. 14F shows the buildings and the boat are given bigger weights.

FIG. 15, FIG. 16 and FIG. 17 are three examples showing sets of three images and the resulted HDR image using the embodiments of a method 200. FIG. 15A, FIG. 16A and FIG. 17A are selected as the maximum underexposed images (−1EV) 106A. FIG. 15B, FIG. 16B and FIG. 17B are selected as the normal exposed images (0EV) 106B. FIG. 15C, FIG. 16C and FIG. 17C are selected as the maximum overexposed images (+1EV) 106C. FIG. 15D, FIG. 16D and FIG. 17D are the resulted HDR images 199. It can be seen from the examples in FIG. 15, FIG. 16 and FIG. 17 that the dynamic range of the highlights and the shadows of the scenes are corrected in the HDR images 199, so the details captured by each image in the set of three images are reflected in the HDR images 199.

According to our test results, when evaluated in an ARM Cortex A9 processor, the proposed method is about 10 times faster than the traditional method which requires the recovery of the HDR radiance maps.

This subject matter disclosure could be widely used in the HDR imaging of image and video, including but not limited to cameras and cellphones with cameras. It is not excluded that the subject matter disclosure could be also applied to other wide dynamic range imaging systems.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for high dynamic range (HDR) imaging, comprising:
    calculating weights of yellow-luminance (Y) components of a set of images in yellow-luminance/blue-luminance/red-luminance (YUV) color space based on a set of lookup tables (LUTs), including:
        applying to the Y component of a maximum underexposed one of the images with a first modified sigmoid function;
        applying to the Y component of a normal exposed one of the images with a derivative of the first modified sigmoid function; and
        applying to the Y component of a maximum overexposed one of the images with a second modified sigmoid function different from the first modified sigmoid function;
    blending the Y components of the set of images with the weights to generate blended Y components; and
    combining the blended Y components with corresponding blue-luminance/red-luminance (UV) components to generate a single HDR image in YUV color space.

2. The method of claim 1, further comprising initializing the set of lookup tables (LUTs) based on exposure configurations of the set of images for HDR imaging.

3. The method of claim 1, further comprising:
    exposing the set of images in red/green/blue (RGB) color space with different exposure configurations, such that each image has a unique exposure configuration; and
    converting the set of images from RGB color space into YUV color space before the calculating.

4. The method of claim 1, further comprising:
    averaging values of the UV components of the set of images in YUV color space to achieve averaged UV components.

5. The method of claim 4, wherein the averaging the UV components comprises,
    applying an averaging calculation to each UV component of the set of images.

6. The method of claim 4, wherein the combining comprises combining the blended Y components with the averaged UV components to generate the single HDR image in YUV color space.

7. The method of claim 6, further comprising:
    converting the single HDR image from YUV color space into RGB color space to generate an HDR image in RGB color space.

8. The method of claim 1 wherein the calculating the weight of the Y component of each image further comprises:
    applying to the Y component of an underexposed one of the images with a first interpolated function between the first modified sigmoid function and the derivative of the first modified sigmoid function; and
    applying to the Y component of an overexposed one of the images with a second interpolated function between the derivative of the first modified sigmoid function and the second modified sigmoid function.

9. The method of claim 8, wherein,
    the applying to the Y component of the underexposed one of the images with the first interpolated function comprises applying a function of $$\alpha S(x, a) + (1 - \alpha)S'(x, a)^{\frac{[x-127]}{255}},$$

where $\alpha$ is a first blending factor and $a$ is a curve-shape controlling parameter; and
    the applying to the Y components of an overexposed image comprises applying a function of $$\beta S(255 - x, a) + (1 - \beta)S'(x, a)^{\frac{[x-127]}{255}},$$

where $\beta$ is a second blending factor.

10. The method of claim 9, wherein the factor $\alpha$ is within a range of [0, 1] and the factor $\beta$ is within a range of [0, 1].

11. The method of claim 1, wherein,
    the applying to the Y component of the maximum underexposed one of the images comprises applying a function of $S(x, \alpha)$, where $\alpha$ is a curve-shape controlling parameter;
    the applying to the Y component of the normal exposed one of the images comprises applying a function of $$S'(x, a)^{\frac{[x-127]}{255}};$$

and
    the applying to the Y component of the maximum overexposed one of the images comprises applying a function of $S(255-x, \alpha)$.

12. The method of claim 1, further comprising,
    smoothing the calculated weights of the Y components.

13. The method of claim 12, wherein the smoothing comprises,
    applying a Gaussian filter with the calculated weights of the Y components.

14. An imaging camera with high dynamic range (HDR) imaging capacity, comprising,
    a processor configured to:
        calculate weights of yellow-luminance (Y) components of a set of images in yellow-luminance/blue-luminance/red-luminance (YUV) color space based on a set of lookup tables (LUTs), including:
            applying to the Y component of a maximum underexposed one of the images with a first modified sigmoid function;
            applying to the Y component of a normal exposed one of the images with a derivative of the first modified sigmoid function; and
            applying to the Y component of a maximum overexposed one of the images with a second modified sigmoid function different from the first modified sigmoid function;
        blend the Y components of the set of images with the weights to generate blended Y components; and
        combine the blended Y components with corresponding UV components to generate a single HDR image in YUV color space.

* * * * *